US010691471B2

(12) United States Patent
Tsirkin

(10) Patent No.: US 10,691,471 B2
(45) Date of Patent: Jun. 23, 2020

(54) CONFLICT RESOLUTION FOR STRONG SYMBOLS

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 3 days.

(21) Appl. No.: 15/991,526

(22) Filed: May 29, 2018

(65) Prior Publication Data

US 2019/0370019 A1 Dec. 5, 2019

(51) Int. Cl.
*G06F 9/445* (2018.01)
*G06F 21/52* (2013.01)
*G06F 9/30* (2018.01)

(52) U.S. Cl.
CPC ...... *G06F 9/44521* (2013.01); *G06F 9/30076* (2013.01); *G06F 21/52* (2013.01)

(58) Field of Classification Search
CPC ... G06F 9/44521; G06F 21/52; G06F 9/30076
See application file for complete search history.

(56) References Cited

U.S. PATENT DOCUMENTS 7,200,843 B2 4/2007 Shann
2012/0011512 A1* 1/2012 Peckham ............ G06F 9/44521 718/100
2012/0324219 A1* 12/2012 Braun .................. G06F 21/125 713/160
2013/0198747 A1* 8/2013 Larkin .................... G06F 9/468 718/1
2014/0101677 A1* 4/2014 Gschwind ............ G06F 9/4484 719/331
2016/0117201 A1* 4/2016 Gschwind ................ G06F 9/54 719/328

OTHER PUBLICATIONS

Linking; 15-213: Introduction to Computer Systems; 11th Lecture, Sep. 30, 2010; Instructors: Randy Bryant and Dave O'Hallaron; Carnegie Mellon; (51 pages).
Linker and Libraries Guide; 2010; https://docs.oracle.com/cd/E19120-01/open.solaris/819-0690/chapter2-93321/index-html; retrieved Mar. 28, 2018; pp. 1-4.
Why is the strong symbol in a shared library overridden by a weak symbol in a static library; by Jie Jiang; mail archive of the gcc-help@gcc.gnu.org mailing list for the GCC project; https://gcc.snu.org.ml/gcc-help/2013-04/msg00068.html; retrieved Mar. 28, 2018; (2 pages).
Re: Why is the strong symbol in a shared library overridden by a weak symbol in a static library; by Ian Lance Taylor; mail archive of the gcc-help@gcc.gnu.org mailing list for the GCC project; https://gcc.snu.org.ml/gcc-help/2013-04/msg00069.html; retrieved Mar. 29, 2018; (1 page).

* cited by examiner

*Primary Examiner* — Charles E Anya
(74) *Attorney, Agent, or Firm* — K&L Gates LLP

(57) ABSTRACT

The present disclosure provides a new and innovative system, methods and apparatus for conflict resolution for strong symbols. In an example, a memory stores a plurality of instructions including a first instruction and a dynamic linker executes on one or more processors to determine that a first reference refers to a first symbol in a strong state and a second symbol in the strong state, where the first symbol and the second symbol share a first name. The first reference is resolved to a third symbol in a weak state also sharing the first name, where the third symbol is a first pointer to the first instruction.

20 Claims, 9 Drawing Sheets

300

310

Determine that a reference refers to a first symbol in a strong state and a second symbol in the strong state

315

Resolve the reference to a third symbol in a weak state sharing a name

300

CONFLICT RESOLUTION FOR STRONG SYMBOLS

BACKGROUND

The present disclosure generally relates to invoking functions in computer systems, specifically as related to mitigating performance degradation caused by certain enhanced security configurations. Generally, if a malicious actor gains access to a memory address that the malicious actor should not have access to based on a computer system's access controls, for example, system components requiring elevated rights or another user's data, the malicious actor may be able to exploit such access by gaining unauthorized control over the computer system, executing unauthorized code, and/or interacting with unauthorized sensitive data. Many computer processors support speculative processing, where the processor assumes that a given input will be true or false and then executes a following processing step in a manner that may be reversed. This is an efficiency optimization that reduces the impact of processing bottlenecks such as loading data from slower storage devices, for example, hard disk or EEPROM. A group of security exploits known as Spectre allow malicious actors to train a processor to make incorrect speculative execution predictions and then leverages the trained behavior of the processor to cause the processor to speculatively execute and retrieve data that the malicious actor should not have access to. Once the data is retrieved and cached, the timing differences between retrieving cached data and data in more persistent storage may be exploited to reveal the contents of targeted victim data.

SUMMARY

The present disclosure provides a new and innovative system, methods and apparatus for conflict resolution for strong symbols. In an example, a memory stores a plurality of instructions including a first instruction and a dynamic linker executes on one or more processors to determine that a first reference refers to a first symbol in a strong state and a second symbol in the strong state, where the first symbol and the second symbol share a first name. The first reference is resolved to a third symbol in a weak state also sharing the first name, where the third symbol is a first pointer to the first instruction.

Additional features and advantages of the disclosed method and apparatus are described in, and will be apparent from, the following Detailed Description and the Figures.

DETAILED DESCRIPTION OF EXAMPLE EMBODIMENTS

Figure 1:
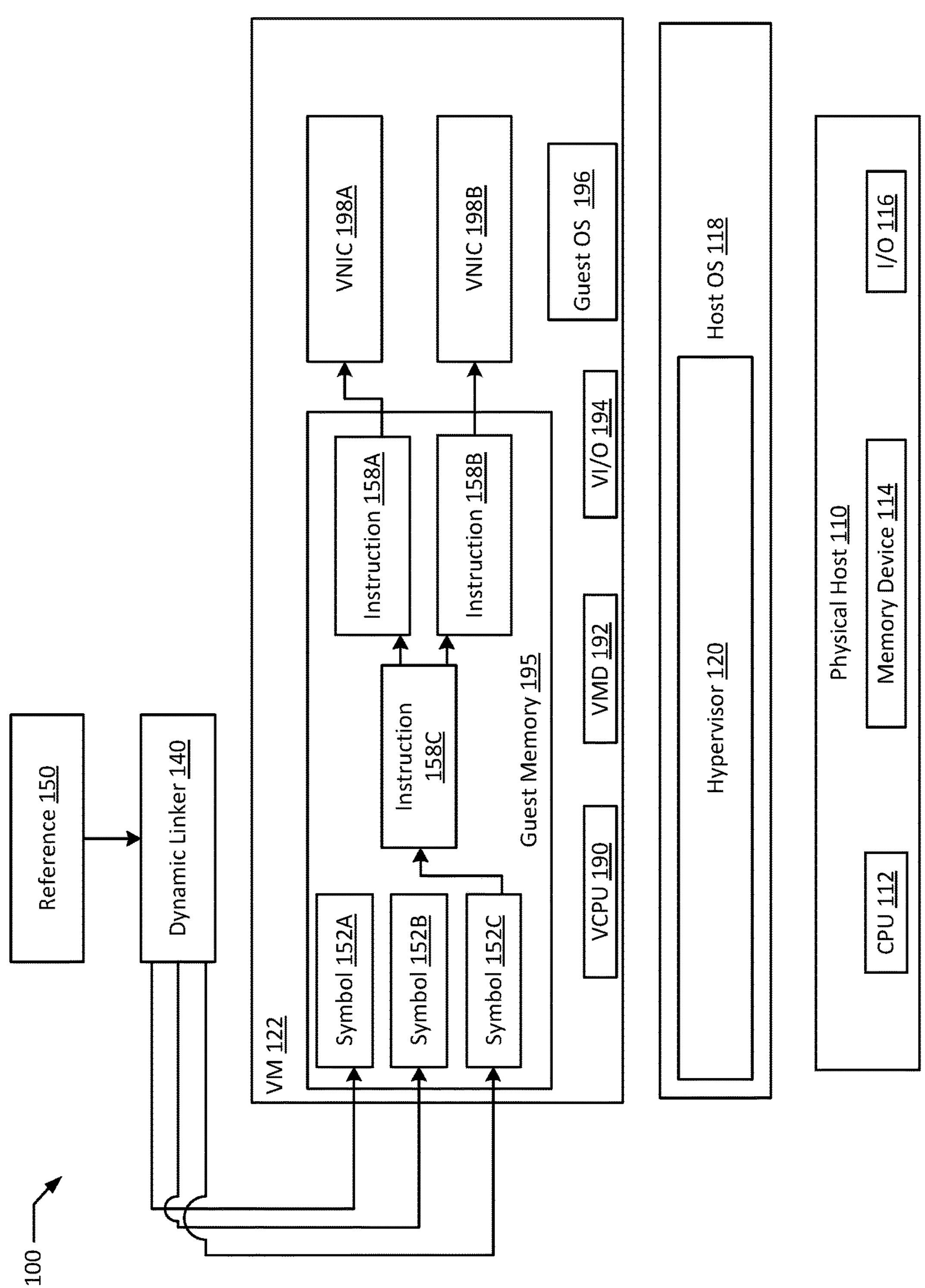
FIG. 1 is a block diagram of a conflict resolution for strong symbols system according to an example of the present disclosure.

Computer systems are typically configured to be shared by users and accounts, each with configured access credentials delineating the computing functions and data that the respective user and/or account has access to. Often times these users and/or accounts may share access to certain computing functionality. Even within a given user session on a computer system, certain processes and/or subprocesses may be isolated away from each other to limit data access. Each application executing on a computer system may also be excluded from the data and/or functionality of other applications on the computer system. For example, a web browser may have access to a system clock of the computer system, but may be excluded from modifying operating system files without an administrator's override. Within that web browser different pages and/or tabs may have their memory access isolated from each other. In the example, each page accessed by the browser may have a different encryption key securing the connection between the computer system and the target system. In an example, if an encryption key is compromised, a malicious actor may intercept transmissions and/or imitate the user of the computer system.

In many computer systems, physical hardware may host isolated guests such as virtual machines and/or containers. In an example, a virtual machine ("VM") may be a robust simulation of an actual physical computer system utilizing a hypervisor to allocate physical resources to the virtual machine. In some examples, a container based virtualization system such as Red Hat® OpenShift® or Docker® may be advantageous, as container based virtualization systems may be lighter weight than systems using virtual machines with hypervisors. In the case of containers, oftentimes a container will be hosted on a physical host or virtual machine that already has an operating system executing, and the container may be hosted on the operating system of the physical host or VM. In sharing physical computing resources, isolated guests and/or a hypervisor controlling them, may also have access to shared components of the underlying physical host. However, such access is typically restricted through a virtualization manager such as a hypervisor to ensure that virtual environments remain segregated and to prevent unauthorized access to other virtual environments on the same physical host, or to the physical host itself.

A commonly exploited security flaw in computer systems relates to exploiting buffer overflow events (e.g., return-oriented-programming ("ROP") attacks). A malicious actor may purposefully over run a fixed sized buffer to place data in an area in memory that should not have been accessible to the malicious actor's programming. If the location in memory of certain routinely used shared libraries is discoverable, return addresses in the call stack of the library may be replaced with a pointer to an address of alternative code placed in memory by the malicious actor. A typical exploitative scenario may involve discovering the location in memory of a shared library executing with higher privileges than the malicious actor has been able to obtain access to on the computer system, and then to redirect certain common functionality of the library to replacement code of the malicious actor's choosing by deliberately triggering a buffer overflow event that overflows onto the privileged library from a non-privileged location in memory. Known techniques may help secure a computer system's kernel space and other components that require elevated rights (e.g., root, admin) to execute. However, if critical memory location(s) of other non-elevated access accounts are discovered, ROP based exploits may often be more easily employed in accessing the data and/or processes of these other victim accounts.

The Spectre family of exploits leverage a processor's speculative execution functionality to discover critical memory locations of shared users and/or accounts on a computer system, and to reveal the contents of these memory locations. In a typical scenario, a malicious actor may first gain access to a computer system with a limited access session through a non-elevated access account. The malicious actor may then execute code to train the computer system's speculative execution components to expect a certain result at a given logical decision point. For example, a program may run where at a certain branch point in the execution with a Boolean return value, the return is true thirty times in a row. The processor now therefore expects the return to be true in subsequent rounds of execution. The attacker then proceeds to flush the processor caches on the computer system, for example by executing a cache flush command or by forcing a large data load. On a subsequent round of execution, the attacker may then feed in a value that would return as false into code similar to the training program, where the data being accessed is outside of the memory space accessible to the attacker, for example, the attacker may address a memory location used by another account. If the falseness of the value relies on a calculation to be performed that requires a slow event, for example, requiring data to be loaded from hard disk or across a network, speculative execution may cause the processor to first load the victim's data into processor cache. While the final execution of the attacking code will be prevented when the value returns as false, the attacker may determine that there is valid data at a given memory location based on differences in timing between data being loaded from cache vs. the computer system searching for invalid data entries. Upon determining that a memory location is valid, the contents of the memory location may be revealed by performing a memory operation that exposes cached data values. If certain key memory locations are discovered, an ROP based attack on the key memory locations may cause additional data to be revealed in a format accessible to the attacker (e.g., written to a file).

An example scenario may be a website set up to discover a user's access credentials or financial data. In the example, a malicious website may employ JavaScript that trains a computer's speculative execution functionality to expect that the website is operating on data within its allocated memory space. The JavaScript program may then attempt to discover and access critical information of other browser pages that are open on the computer system, for example, to discover a private encryption key for the browser sessions of those pages. With the encryption keys in hand, the malicious website may pretend to be the user gaining access to, for example, email sessions or banking sessions. To secure systems against the Spectre family of attacks, because the exploits are based on hardware behavior, many systems requiring heightened security may disable speculative execution. However, disabling speculative execution may significantly slow down processing in applications where certain branches of execution are routinely favored.

A common programming technique that generates predictable branches, which become bottlenecks with speculative execution disabled, is the usage of strong vs. weak symbols. A symbol may typically be a name for an identifiable subcomponent in programming code, typically used to link an available system component to an executable file, for example, a function, subroutine, variable, etc. When a symbol is created, for example, when a function or variable is declared, the symbol may be declared as either strong or weak. Typically, a strong symbol is defined when it is declared, with a specific value (e.g., of a component) associated with the declared symbol. In some systems, symbols, when declared, default as strong symbols unless a weak symbol flag is set. Other systems are configured for the opposite behavior. As a rule, a strong symbol overrides all weak symbols of the same name and is loaded and/or linked in place of the weak symbol if both are present in a program. However, if multiple strong symbols of the same name exist, a compiler and/or linker of the system will raise an error and an executable file will typically fail to be generated because the system will recognize that the strong symbol cannot simultaneously reference two separate modules. This is because the system typically requires clarity on which component will be invoked by a reference to the symbol. Multiple weak symbols, however, may typically be accepted by a compiler and/or linker on a system because they may all be declared without any initial set value. Conflicting weak symbols may, however, cause unexpected behavior at execution time if the component referenced at a given point in the execution of a program is not the expected component. Some compilers and/or linkers may be configured to stop searching for symbols after finding any symbol, strong or weak to help avoid potential conflicts.

Because a consequence of conflicting strong symbols is typically a program that cannot be compiled and/or executed, in many situations where developers are unsure what modules will be available where their code is being executed, for example, when developing platform independent code to execute on cloud environments, the developers may default to coding weak symbols to avoid possible clashes between conflicting strong symbols. For example, a program may need to transmit data over a network, which requires invoking a transmit function in a network interface, typically through a driver of the interface. However, a system may have multiple network interfaces, which may have multiple different drivers and transmit functions, especially if they are of different makes and/or models. Several of these functions may be similarly named (e.g., transmit( )). Rather than calling "transmit( )" in their code, which may be a strong symbol of one or more network drivers and thereby introducing a potential conflict, a developer may instead implement a function (e.g., broadcast( )) to discover and call each transmit function available on the system. In many examples, creators of drivers for computing devices may often opt not to expose functionality for direct invocation in the form of symbols for similar reasons, to avoid potential conflicts. In these examples, each driver may instead expose an initialization function as a symbol which, when called, identifies other functions of the driver and references to their locations in memory. The location of, for example a "transmit( )" function may then be stored in a data structure including all possible transmit functions for use in future invocations of the "broadcast( )" function. As a result, in many typical systems, a branch is introduced in the code where a processor executing the code must wait for analysis to be completed on the available transmit functions before executing the transmission. With speculative execution available, the processor may proceed assuming that no hardware and/or driver change has occurred since the function was last called. Without speculative execution the processor would be required to wait for the discovery step to complete.

Disabling speculative execution may be advisable from a security standpoint, especially in large scale shared environments such as multi-tenant clouds. However, code executing in such environments may also be more likely to be implemented without referencing strong symbols since developers typically have little control over the systems their code will execute on. The combination of these two factors leads to suboptimal implementations with significantly reduced computing efficiency.

The present disclosure aims to restore some of the computing efficiency lost by disabling speculative execution, for example, to guard against Spectre attacks, by reducing branch prediction decisions, especially in the context of virtualized cloud environments through implementing conflict resolution for strong symbols. For example, existing systems have a decision tree where multiple strong symbols result in an error, and a strong symbol always takes precedence over a weak symbol. With conflict resolution for strong symbols, under circumstances where multiple strong symbols are present, rather than generating an error, a weak symbol (if available) is selected over the strong symbols. This enables developers to code with strong symbols without risking their code being incompatible due to a symbol clash so long as the alternative logic of cycling through conflicting strong symbols is available as a weak symbol. In the networking example above, a developer may implement a transmit( ) function as a strong symbol, while also supplying a weak symbol version of transmit( ) that cycles through all available transmit functions on the system. In a system with only one network driver, evaluation of the weak symbol may be avoided and processing may proceed directly through the one network driver. In a system with multiple network drivers, the program functionality would then revert to evaluating the weak symbol and using each transmit function of the different drivers in turn. This behavior may be especially advantageous in virtualized environments such as those typically implemented in cloud environments. For example, while a developer may not know the precise components that will be available on each cloud host that executes the code, within each virtual host there is typically only one driver for each device type to make the hosts easier to administer. Therefore, by allowing developers more freedom to code with strong symbols (e.g., by preventing errors and/or crashes where strong symbols conflict), branch decision points may be eliminated in many instances thereby regaining some of the computing efficiency lost by disabling speculative execution. Thus, the present disclosure may improve computation speeds in environments where the use of strong symbols reduces potential decision branches in the logical flow of an application while maintaining improved security.

FIG. 1 is a block diagram of an enhanced address space layout randomization system according to an example of the present disclosure. The system 100 may include one or more physical host(s) 110. Physical host 110 may in turn include one or more physical processor(s) (e.g., CPU 112) communicatively coupled to memory device(s) (e.g., MD 114) and input/output device(s) (e.g., I/O 116). As used herein, physical processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory device 114 refers to volatile or non-volatile memory devices, such as RAM, ROM, EEPROM, or any other device capable of storing data. As discussed herein, I/O device(s) 116 refer to devices capable of providing an interface between one or more processor pins and an external device, the operation of which is based on the processor inputting and/or outputting binary data. CPU(s) 112 may be interconnected using a variety of techniques, ranging from a point-to-point processor interconnect, to a system area network, such as an Ethernet-based network. Local connections within physical host 110, including the connections between processor 112 and a memory device 114 and between processor 112 and I/O device 116 may be provided by one or more local buses of suitable architecture, for example, peripheral component interconnect (PCI).

In an example, physical host 110 may run one or more isolated guests, for example, VM 122, which may in turn host additional virtual environments (e.g., VMs and/or containers). In an example, a container may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, a given service may require the deployment of multiple VMs, containers and/or pods in multiple physical locations. In an example, VM 122 may be a VM executing on physical host 110. In an example, dynamic linker 140 may execute independently, as part of host OS 118, as part of hypervisor 120, or as part of guest OS 196.

System 100 may run one or more VMs (e.g., VM 122), by executing a software layer (e.g., hypervisor 120) above the hardware and below the VM 122, as schematically shown in FIG. 1. In an example, the hypervisor 120 may be a component of respective host operating system 118 executed on physical host 110. In another example, the hypervisor 120 may be provided by an application running on host operating system 118. In an example, hypervisor 120 may run directly on physical host 110 without an operating system beneath hypervisor 120. Hypervisor 120 may virtualize the physical layer, including processors, memory, and I/O devices, and present this virtualization to VM 122 as devices, including virtual central processing unit ("VCPU") 190, virtual memory devices ("VIVID") 192, virtual input/output ("VI/O") device 194, and/or guest memory 195. In an example, another virtual guest (e.g., a VM or container) may execute directly on host OSs 118 without an intervening layer of virtualization.

In an example, a VM 122 may be a virtual machine and may execute a guest operating system 196 which may utilize the underlying VCPU 190, VIVID 192, and VI/O 194. Processor virtualization may be implemented by the hypervisor 120 scheduling time slots on physical processors 112 such that from the guest operating system's perspective those time slots are scheduled on a virtual processor 190. VM 122 may run on any type of dependent, independent, compatible, and/or incompatible applications on the underlying hardware and host operating system 118. The hypervisor 120 may manage memory for the host operating system 118 as well as memory allocated to the VM 122 and guest operating system 196 such as guest memory 195 provided to guest OS 196.

In an example, any form of suitable network for enabling communications between computing devices, for example, a public network (e.g., the Internet), a private network (e.g., a local area network (LAN) or wide area network (WAN)), or a combination thereof may be employed to connect physical host 110, VM 122, and/or any additional virtual guests to other computer systems. In an example, dynamic linker 140 may be a component that links references (e.g., reference 150) in computing code to computing modules in system 100. In various examples, memory manager 140 may be a physical hardware component, a software component, or a combination of both hardware and software. In an example, dynamic linker 140 may be implemented via any suitable form of computing module (e.g., application, executable, script, hardware module, etc.). In an example, dynamic linker 140 may take executable files and link them to system components (e.g., libraries, drivers, functions, etc.). For example, typical executable files may be stored in a format such as Executable and Linkable Format ("ELF") and dynamic linker 140 may be an ELF loader. In an example, reference 150 may be a function name provided to dynamic linker 140. In the example, dynamic linker 140 may detect that reference 150 refers to three symbols in guest memory 195 (e.g., symbols 152A-C) all sharing the same name (e.g., transmit( )). In the example, symbol 152A may be associated with instruction 158A, symbol 152B may be associated with instruction 158B, and symbol 152C may be associated with instruction 158C. In the example, symbols 152A-B may be strong symbols and symbol 152C may be a weak symbol. In the example, dynamic linker 140 resolves the conflict between strong symbols 152A-B by linking reference 150 with symbol 152C (e.g., the weak symbol) which in turn executes instruction 158C, which is an instruction to execute both instructions 158A and 158B.

In an example, VM 122 may be connected to one or more networks via two network interfaces (e.g., virtual network interface cards ("VNICs") 198A-B). In the example, instruction 158A may be a transmit instruction included in a driver for VNIC 198A, while instruction 198B may be a transmit instruction included in a driver for VNIC 198B. In the example, VNICs 198A-B use different drivers which causes the conflict between symbols 152A and 152B. In an example, one VNIC (e.g., VNIC 198A) may handle unsecure network traffic with the public internet, while the other VNIC (e.g., VNIC 198B) may handle secure traffic to a secure network. In the example, separate network interfaces and/or separate drivers provides additional security against intrusion. In an example, VNICs 198A and 198B may have different network addresses.

Figure 2A:
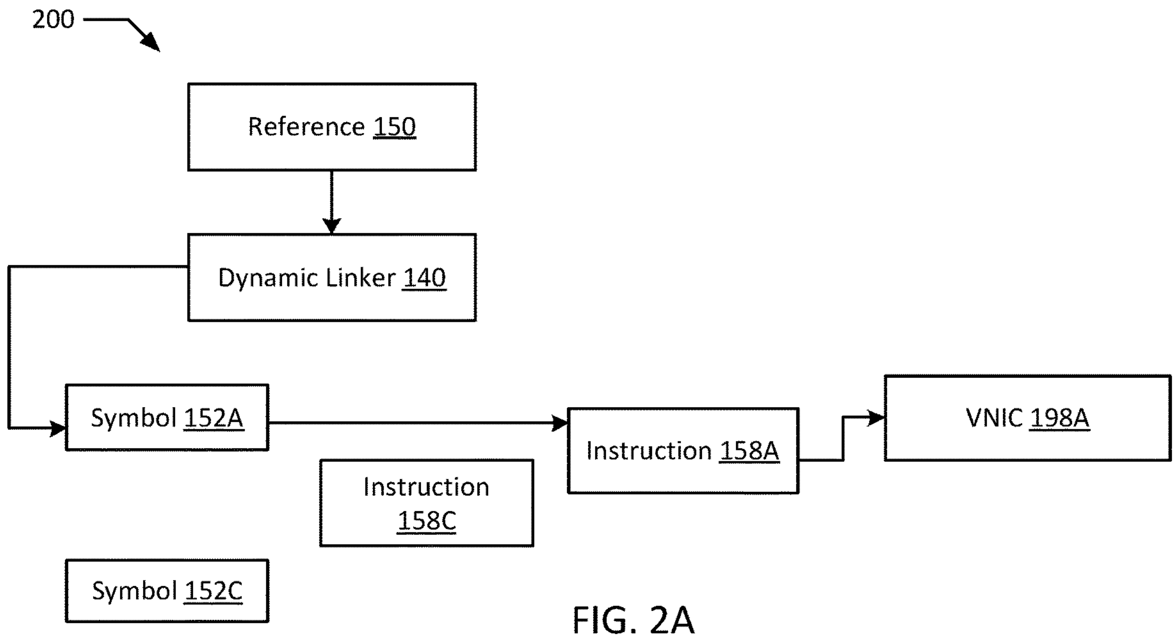
FIGS. 2A-D are block diagrams illustrating conflict resolution for strong symbols according to an example of the present disclosure.

FIGS. 2A-D are block diagrams illustrating conflict resolution for strong symbols according to an example of the present disclosure. Illustrated system 200 depicted in FIG. 2A shows a system where reference 150 is resolved by dynamic linker 140 to reference two symbols, symbol 152A in a strong unshared state, and symbol 152C in a weak unshared state, where symbol 152A is a pointer to instruction 158A, and symbol 152C is a pointer to instruction 158C. In the example, dynamic linker 140 determines that a single, unshared, strong symbol 152A trumps a weak symbol 152C and therefore reference 150 is resolved to symbol 152A, and instruction 158A may be directly invoked, triggering a function of VNIC 198A (e.g., transmission). In an example, symbol 152C may be an alternative weak symbol, for example, one that triggers each transmit function present on a system. In the example, symbol 152C may be coded by a programmer of the program where reference 150 is implemented. In another example, symbol 152C may be a function of the host operating system 118, for example, a function to resolve conflicting strong symbols. In an example, symbol 152C and instruction 158C may be automatically generated upon dynamic linker 140 identifying a strong symbol conflict.

Figure 2B:
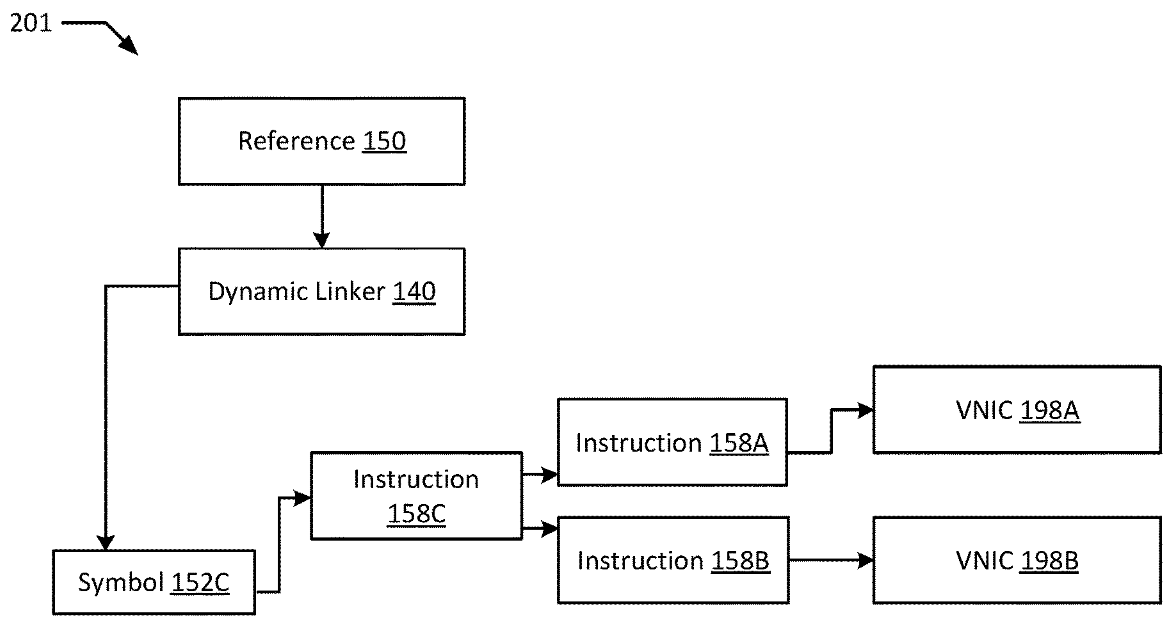

Illustrated system 201 depicted in FIG. 2B shows an alternative version of system 200, where dynamic linker 140 does not resolve reference 150 to any strong symbols, rather reference 150 only resolves to a weak symbol in the unshared state. In the example, unshared weak symbol 152C is a pointer to instruction 158C which triggers instructions 158A and 158B when executed. In the example, instructions 158A and 158B are instructions respectively associated with VNICs 198A and 198B, for example, to transmit a message. In an example, weak symbols may be in the shared state, for example, where both an application of reference 150 and guest OS 196 have a version of a broadcast transmit function implemented. In an example, dynamic linker 140 may determine which instruction to execute between the application and OS versions of the weak symbol based on context in the code of the application. In another example, dynamic linker 140 may be configured to preferentially select between weak symbols, to predictably resolve conflicts (e.g., application first or OS first). In an example, dynamic linker 140 may select an arbitrary resolution for conflicting weak symbols, (e.g., based on memory location). In an example, a strong symbol in the unshared state always takes precedence over any number of weak symbols.

Figure 2C:
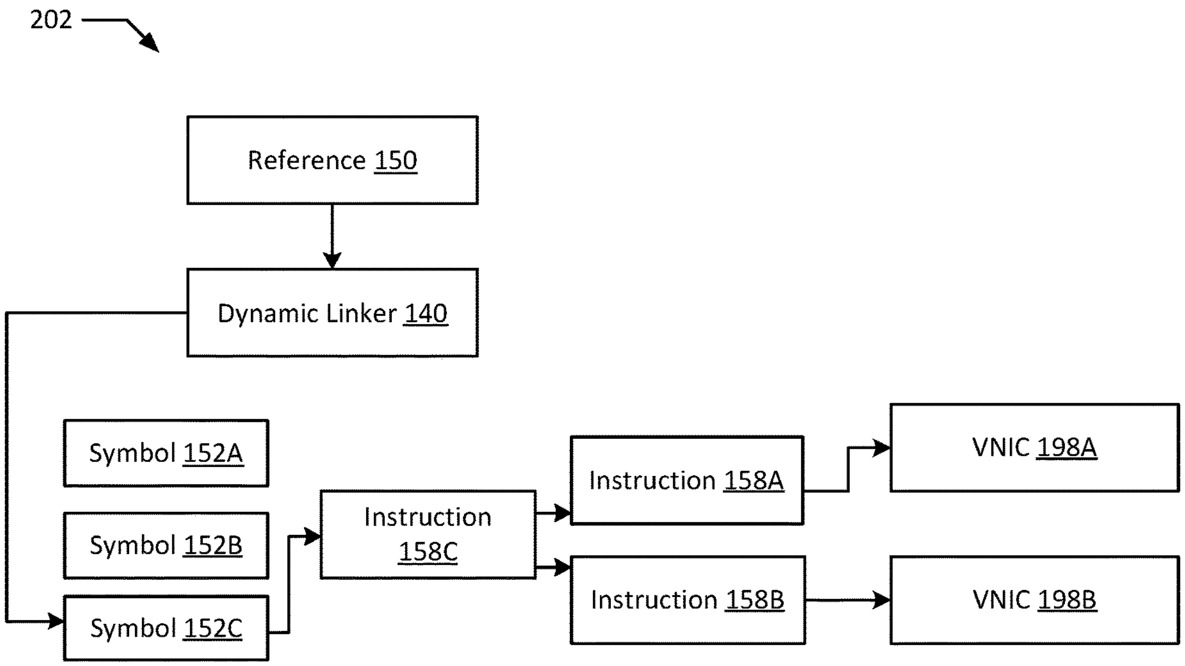

Illustrated system 202 depicted in FIG. 2C shows an alternative version of system 200, where dynamic linker 140 resolves reference 150 to three symbols, symbols 152A and 152B in the shared strong state (e.g., both of symbols 152A and 152B share a reference name and both are strong symbols), and symbol 152C in the unshared weak state. A conflict therefore exists between strong symbols 152A and 152B. Dynamic linker 140 resolves this conflict by resolving reference 150 to weak symbol 152C. In the example, unshared weak symbol 152C is a pointer to instruction 158C which triggers instructions 158A and 158B when executed. In the example, instructions 158A and 158B are instructions respectively associated with VNICs 198A and 198B, for example, to transmit a message.

Figure 2D:
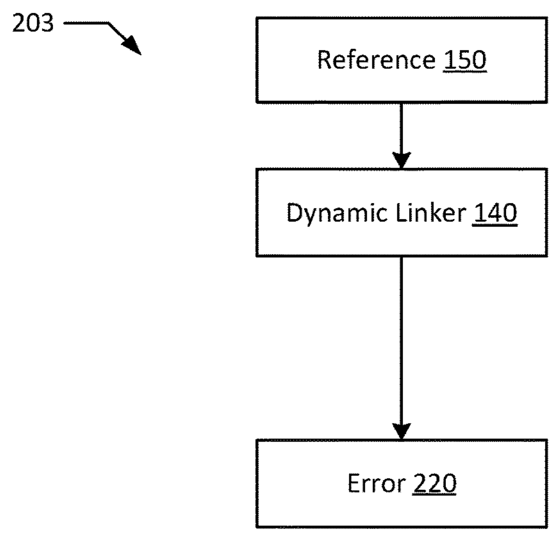

Illustrated system 203 depicted in FIG. 2D shows an alternative version of system 200, where reference 150 does not resolve to any symbols strong or weak, and dynamic linker 140 generates error 220.

In an example, reference 150 may be re-resolved by dynamic linker 140 based on devices (e.g., VNICs 198A-B) being connected and/or mounted to VM 122 or disconnected and/or unmounted. In an example, a current resolution result of reference 150 may be saved by dynamic linker 140, with alternative resolutions backed up and ready to be implemented. For example, in the ELF format, the relocation value may be leveraged for implementing alternative resolution results for reference 150. For example, instead of permanent resolution until an application is reloaded, a current relocation value may be dynamically changed based on symbol conflict resolution results (e.g., weak symbol over no symbol, unshared strong symbol over weak symbol, weak symbol over shared strong symbols).

In an example, weak symbol 152C may be a function of guest OS 196 (e.g., broadcast_packet( )). In the example, strong symbol 152A may be a function of a driver for VNIC 198A (e.g., broadcast_packet( )), while strong symbol 152B may be a function of a driver for VNIC 198B (e.g., broadcast_packet( )). A program may call broadcast_packet( ) to send a message out to local network recipients from VM 122. In an example, the guest OS 196 function (e.g., instruction 158C) searches for any other copies of the broadcast_packet( ) function associated with VM 122 and calls them in turn. This search requires the VCPU 190 to pause while handling the program's transmission command to discover all of the available functions before executing. If speculative execution is enabled, VCPU 190 may speculatively process that instructions 158A and 158B are going to be invoked and continue processing while this assumption is verified in parallel. Without speculative execution, confirmation needs to come first. In the example, directly resolving reference 150 as symbol 152A would only invoke the broadcast_packet( ) function of VNIC 198A. However, this resolution avoids requiring VCPU 190 to wait for confirmation since only one option is available. If speculative execution is disabled but VNIC 198B is disconnected, only one strong symbol for broadcast_packet( ) would remain (e.g., symbol 152A). With conflict resolution for strong symbols, drivers may therefore be configured to leverage strong symbols with the understanding that if only one option is presented in a given system, faster execution would result, but that where multiple options are present, the expected functions would still be executed by defaulting to an operating system backup function such as instruction 158C.

In an example, a driver of VNIC 198A may be implemented with a strong symbol 152A, while a driver of VNIC 198B may be implemented with a weak symbol 152A. In the example, reference 150 may be resolved to symbol 152A (e.g., instruction 158A associated with VNIC 198A). In an example, even if symbol 152C is another weak symbol associated with guest OS 196 that is a pointer to instruction 158C, which would invoke both instructions 158A and 158B, where both symbols 152B and 152C are weak symbols, reference 150 is still resolved to symbol 152A. In an example, if all three of symbols 152A-C are weak symbols, reference 150 may be preferentially resolved to symbol 152C associated with guest OS 196 in favor of symbols 152A and 152B associated with the drivers of VNICs 198A-B. In an example, symbol 152C associated with guest OS 196 may be configured to execute multiple related instructions associated with non-conflicting symbols. For example, symbol 152A may refer to a transmit( ) function of a driver of VNIC 198A, while symbolc 152B may refer to a send( ) function of driver VNIC 198B similar in function to the transmit( ) function of VNIC 198A. In the example, if reference 150 calls for a transmit( ) function, reference 150 may be resolved to symbol 152A over a transmit( ) function of guest OS 196. However, if reference 150 calls for a broadcast( ) function, reference 150 may be resolved as a broadcast( ) function of guest OS 196 (e.g., symbol 152C) which may in turn invoke both the transmit( ) function of VNIC 198A (e.g., symbol 152A) as well as the send( ) function of VNIC 198B (e.g., symbol 152B).

Figure 3:
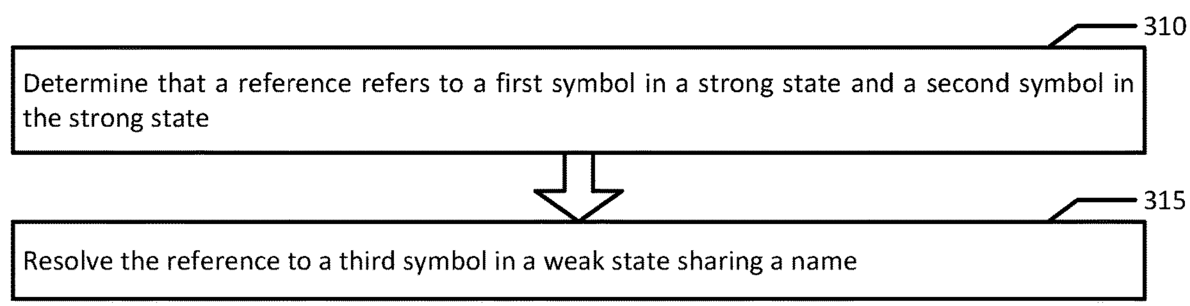
FIG. 3 is a flowchart illustrating an example of conflict resolution for strong symbols according to an example of the present disclosure.

FIG. 3 is a flowchart illustrating an example of conflict resolution for strong symbols according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by a dynamic linker 140.

Example method 300 may begin with determining that a first reference refers to a first symbol in a strong state and a second symbol in the strong state (block 310). In an example, the first symbol and the second symbol share a first name (e.g., reference 150). In an example, symbols 152A-C all share a name (e.g., reference 150). In the example, symbols 152A-B are strong symbols. In the example, dynamic linker 140 executes on VM 122 and resolves reference 150 to symbol 152C (e.g., a weak symbol associated with guest OS 196).

The first reference is resolved to a third symbol in a weak state sharing a name (block 315). In an example, the third symbol is a first pointer to a first instruction of a plurality of instructions. In an example, symbols 152A-C may all share a name associated with reference 150 (e.g., transmit( )). For example, symbol 152C is a pointer to instruction 158C, which, when executed, invokes instructions 158A and 158B associated with strong symbols 152A and 152B respectively. In an example, symbol 152C and/or instruction 158C may be dynamically generated after dynamic linker 140 determines that symbols 152A and 152B are strong symbols in conflict. In such examples, guest OS 196 may be configured to generate symbol 152C and/or instruction 158C to resolve the strong symbol conflict. In an example, symbol 152C may be a reference to an operating system component (e.g., of guest OS 196). However, the instructions associated with symbol 152C may be dynamically generated. For example, symbol 152C may be preexisting, but the logic of instruction 158C (e.g., executing instructions 158A and 158B) may be dynamically populated based on the strong symbols 152A-B sharing a name (e.g., reference 150) with symbol 152C. In another example, instruction 158C may also include logic to discover any applicable instructions to execute including instructions 158A-B. In an example, dynamically generating a new instruction to specifically execute both instructions 158A and 158B without seeking any new options may provide performance advantages in environments where configurations are fairly static, because executing both instructions 158A and 158B without any additional confirmation that instructions 158A and 158B are the only options available avoids requiring VCPU 190 to wait for confirmation, thereby avoiding a branch decision point. In such examples, the determination of the universe of possible instructions with conflicting strong symbols may be conducted periodically. For example, a timeout or message count may be set to determine when the determination needs to be refreshed. In another example, a subscription to be notified for driver installations and/or uninstallations may be implemented, for example, by dynamic linker 140 and/or guest OS 196 to be notified of possible triggers for regenerating instruction 158C.

In an example, a third VNIC associated with a third driver may be connected to VM 122, the driver including another symbol sharing reference 150 with symbols 152A-C. In the example, instruction 158C, when executed, also triggers a new instruction associated with the new driver of the new VNIC. In some examples, instruction 158C may require an update to add the new instruction. In other examples, instruction 158C when executed may automatically discover the new instruction based on logic to seek matching instructions executed on each invocation of instruction 158C. In another example, upon VNIC 198B being disconnected, dynamic linker 140 re-resolves reference 150 to symbol 152A to directly invoke instruction 158A, thereby bypassing instruction 158C and increasing computing efficiency.

In an example, VM 122 may also include a singular graphical processor device, and a function call to render an image may match both a strong symbol of the graphical driver of the graphical processor device as well as a weak symbol of the guest OS 196 configured to render graphics on any available output device. In the example, the dynamic linker 140 may resolve the render function to the strong symbol associated with the graphical driver, and executing the render function would then result in executing an instruction of the graphical driver based on the reference to the render function being resolved as a pointer to the instruction of the graphical driver. In the example, if a second graphical driver is installed, with a conflictingly named render function also referenced by a strong symbol, dynamic linker 140 may re-resolve the render function to the guest OS 196 weak symbol to invoke the render function of both graphical drivers.

In an example, guest OS 196 may be implemented with generic instructions, for example associated with a plurality of devices connected to VM 122. For example, a function to reset all devices may be implemented with a weak symbol in guest OS 196. In the example, the reset function may be implemented with a name that is not shared with any function of any device driver. However, the instructions triggered by invoking the reset function may discover a reset function associated with each driver to invoke. In an example, the reset function may instead reinitialize a driver through guest OS 196 without calling any function of the driver itself.

Figure 4:
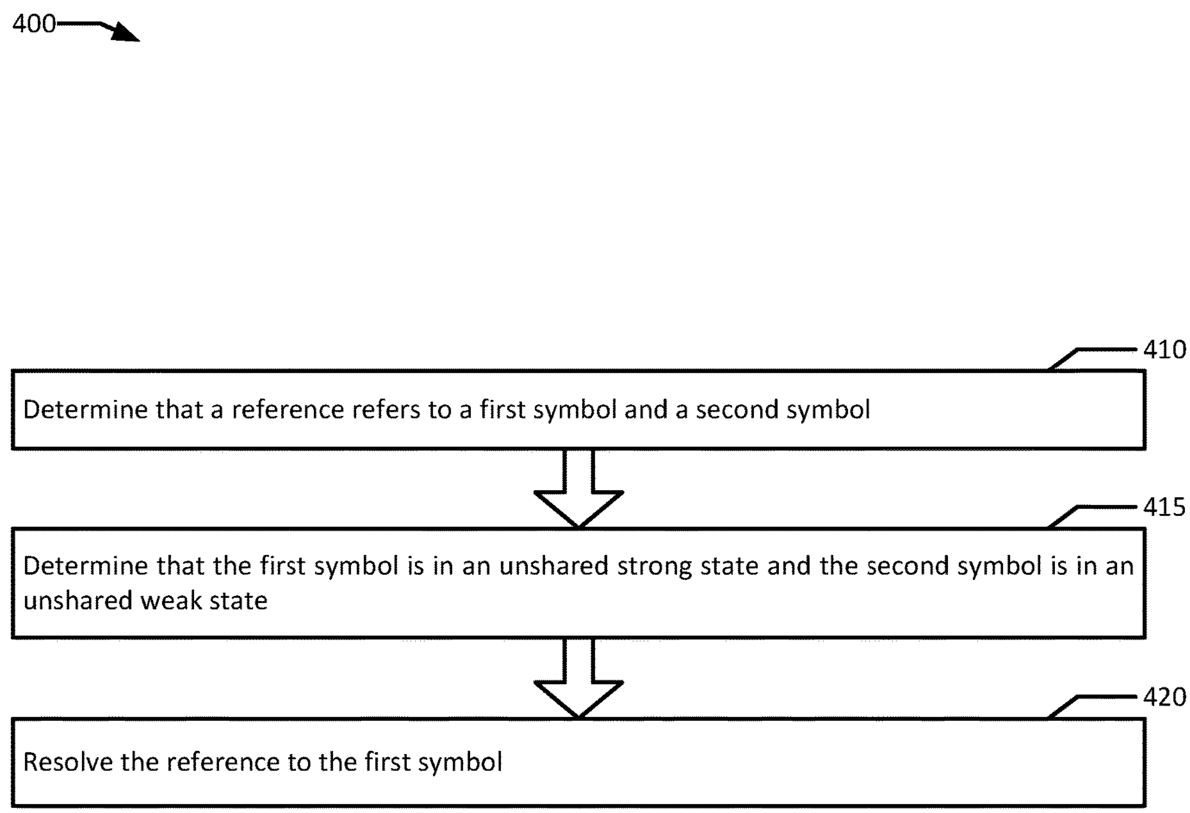
FIG. 4 is a flowchart illustrating an example of conflict resolution for strong symbols in a virtualized system according to an example of the present disclosure.

FIG. 4 is a flowchart illustrating an example of conflict resolution for strong symbols in a virtualized system according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by a dynamic linker 140.

Example method 400 may begin with determining that a reference refers to a first symbol and a second symbol (block 410). In an example, each symbol is in either a strong state or a weak state, and each of the strong state and the weak state is either shared or unshared, where the first symbol is associated with a first instruction included in a first driver associated with a first device mounted to an isolated guest. For example, reference 150 refers to symbols 152A and 152B. In an example, a symbol in the strong state is one that is defined definitively while a symbol in the weak state may be a symbol that is initially declared relatively (e.g., X=1 vs. X=Y, where Y is not yet defined). In the example multiple strong declarations of the same symbol cannot be simultaneously true if a program is to generate predictable results. In an example, strong symbol 152A may be a pointer to a specific instruction 158A in a specific memory location in VIVID 192. However, weak symbol 152C may initially be declared as a symbol that exists without a specific value, and the value (e.g., instruction 158C) may require additional computation to determine. Where strong symbols 152A and 152B share the strong state, a conflict arises that requires resolution.

The first symbol is determined to be in the unshared strong state and the second symbol is in the unshared weak state (block 415). In an example, symbol 152A in an unshared strong state directly invokes a function of VNIC 198A (e.g., instruction 158A), while symbol 152C is associated with guest OS 196 or a program that includes reference 150. In the example, when a function associated with weak symbol 152C is invoked, each other symbol in VM 122 that shares reference 150 (e.g., a name of the symbols) is invoked by instruction 158C associated with symbol 152C.

The reference is resolved to the first symbol (block 420). In an example, reference 150 is resolved to the first symbol (e.g., symbol 152A) is a first pointer to the first instruction (e.g., instruction 158A). In an example, symbol 152A is associated with a transmit function of VNIC 198A and symbol 152C is associated with a transmit function of guest OS 196 and/or VM 122. In an example, symbol 152B is associated with a transmit function of VNIC 198B which is later mounted to VM 122. In the example, where dynamic linker 140 previously resolved reference 150 to symbol 152A, after the mounting of VNIC 198B and the activation of VNIC 198B's associated driver, symbol 152B becomes another match for reference 150, and therefore symbol 152A transitions from a strong unshared state to a strong shared state with symbol 152B sharing the strong shared state. In the example, because the strong symbols 152A-B matching reference 150 are in the shared state, dynamic linker 140 re-resolves reference 150 to symbol 152C in the weak state. In an example, if multiple symbols in the weak state are available, dynamic linker 140 may select one of the weak symbol options, for example, based on an order of precedence (e.g., application of reference 150, then guest OS 196, then component of another program such as a driver). In another example, an error may be raised where weak symbols are in a shared weak state. For example, a dynamic linker 140 executing in a debugging mode may discover conflicting weak symbols and flag the conflict as a potential bug. In an example, executing instruction 158C associated with weak unshared symbol 152C results in the execution of both instructions 158A and 158B. In an example, VNIC 198A is disconnected and its associated driver disabled. In the example, symbol 152B transitions to an unshared strong state and dynamic linker 140 re-resolves reference 150 to symbol 152B. In the example, executing reference 150 then invokes instruction 158B directly without the intervening execution of instruction 158C. In an example, if VNIC 198B is also disconnected, dynamic linker 140 may raise an error. For example, dynamic linker 140 may first re-resolve reference 150 to symbol 152C. However, symbol 152C when evaluated may yield that the list of instructions to be triggered by executing instruction 158C is null, thereby raising an error. In an example, if reference 150 fails to match any symbol, an error 220 is raised.

Figure 5:
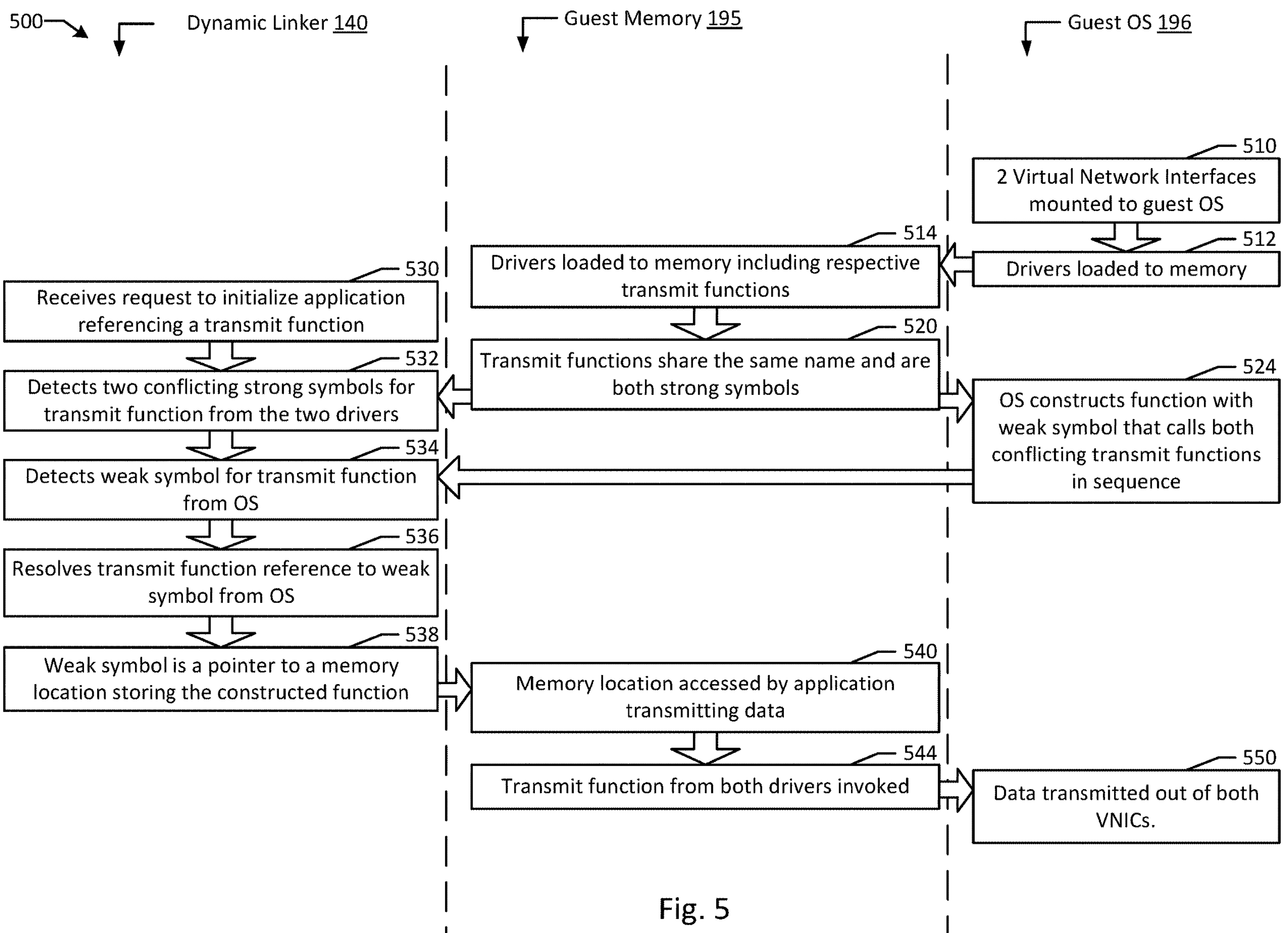
FIG. 5 is flow diagram of an example of resolving a conflict between strong symbols according to an example of the present disclosure.

FIG. 5 is flow diagram of an example of resolving a conflict between strong symbols according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, a dynamic linker 140, guest memory 195, and guest OS 196 execute conflict resolution between strong symbols.

In example system 500, VNICS 198A-B are mounted to guest OS 196 (block 510). In the example, respective drivers of VNICs 198A-B are loaded to guest memory 195 (block 512). In the example, the drivers loaded to guest memory 195 include respective transmit functions of VNICs 198A-B (e.g., instructions 158A-B) (block 514). In the example, both instructions 158A-B share a common name and are referenced by a shared strong symbol (e.g., symbols 152A-B) (block 520). In an example, guest OS 196 constructs a new function to execute both instructions 158A and 158B in sequence (e.g., instruction 158C) that shares the same name (e.g., symbols 152A-C) with instructions 158A and 158B, where instruction 158C is declared with a weak symbol 152C (block 524). In an example, guest OS 196 includes a default function that invokes each transmit function currently associated with guest OS 196 in sequence. In the example, instead of generating a new function specifically to invoke instructions 158A and 158B, a slower instruction may be executed to search for and execute any transmit( ) functions in any drivers currently loaded.

In an example, dynamic linker 140 receives a request to initialize an application referencing a transmit function (e.g., via reference 150) (block 530). In the example, dynamic linker 140 detects two conflicting strong symbols for transmit functions (e.g., instructions 158A and 158B) from the two drivers of VNICs 198A-B (block 532). In the example, dynamic linker 140 also detects weak symbol 152C as a transmit function of guest OS 196 (block 534). In the example, dynamic linker 140 resolves the conflict between strong symbols 152A-B by resolving reference 150 to weak symbol 152C (block 536). In an example, weak symbol 152C is a pointer to one or more memory locations storing the function (e.g., instruction 158C) constructed by guest OS 196 to trigger both instructions 158A and 158B (block 538). In an example, guest OS 196 and/or dynamic linker 140 generates weak symbol 152C based on dynamic linker 140 determining that there is a conflict among more than one strong symbol (e.g., symbols 152A-B).

In an example, the memory location of instruction 158C in guest memory 195 is accessed by the application of reference 150 requesting to transmit data (block 540). In the example, the transmit functions of both of the drivers of VNICs 198A and 198B (e.g., instructions 158A-B) are invoked (block 544). In the example, the data is transmitted out of both VNICs 198A-B (block 550).

Figure 6:
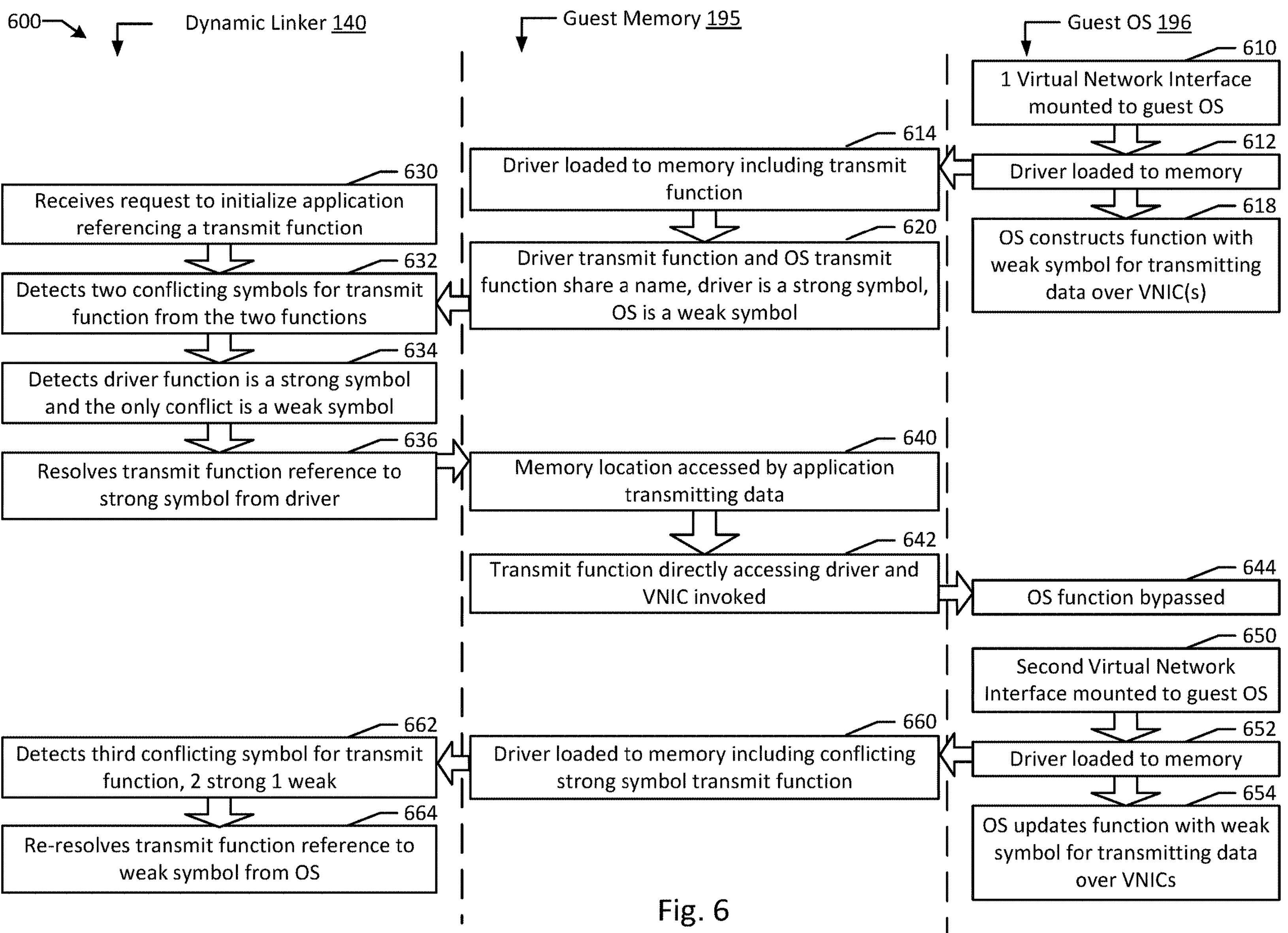
FIG. 6 is flow diagram of an example of introducing and then resolving a conflict between strong symbols according to an example of the present disclosure.

FIG. 6 is flow diagram of an example of introducing and then resolving a conflict between strong symbols according to an example of the present disclosure. Although the examples below are described with reference to the flowchart illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, a dynamic linker 140, guest memory 195, and guest OS 196 resolve a later introduced conflict between strong symbols.

In example system 600, guest OS 196 initially has one VNIC 198A mounted (block 610). In the example, a driver of VNIC 198A is loaded to guest memory 195 (block 612). In the example, guest memory 195 stores VNIC 198A's driver including the driver's transmit function (e.g., instruction 158A) (block 614). In the example, guest OS 196 constructs a function (e.g., instruction 158C) declared with a weak symbol 152C for transmitting data over any VNICs (e.g., VNIC 198A) connected to guest OS 196 (block 618). In the example, the VNIC 198A's transmit function (e.g., instruction 158A) and guest OS 196's transmit function (e.g., instruction 158C) share a name of symbols 152A and 152C, with symbol 152A of the driver being a strong symbol and symbol 152C of guest OS 196 being a weak symbol (block 620).

In an example, dynamic linker 140 receives a request to initialize an application referencing a transmit function (e.g., via reference 150) (block 630). In the example, dynamic linker 140 detects the conflicting symbols 152A and 152C for transmit functions matching reference 150 in guest memory 195 (block 632). In the example, dynamic linker 140 determins that symbol 152A is in the unshared strong state while conflicting symbol 152C is in the unshared weak state (block 634). Based on determining that an unshared strong symbol takes precedence over weak symbols, dynamic linker 140 resolves reference 150 to strong symbol 152A (block 636). A memory location of instruction 158A is then accessed by the application to transmit data (block 640). In the example, the transmit function (e.g., instruction 158A) of the driver is directly accessed and VNIC 198A by the application based on reference 150 being resolved to a pointer to instruction 158A (e.g., symbol 152A) (block 642). In the example, guest OS 196's transmit function (e.g., instruction 158C) is bypassed (block 644).

In an example, a second VNIC 198B is mounted to guest OS 196 (block 650). In the example, a driver for VNIC 198B is loaded to guest memory 195 (block 652). In the example, the guest OS 196 updates instruction 158C to transmit data from both VNICs 198A and 198B (block 654). In the example, loading VNIC 198B's driver to guest memory 195 includes loading another strong symbol referenced transmit function (e.g., instruction 158B associated with symbol 152B) (block 660). In the example, dynamic linker 140 detects the third conflicting symbol 152B for the transmit function, resulting in two strong symbols (e.g., symbols 152A-B) to one weak symbol 152C (block 662). In the example, dynamic linker 140 re-resolves reference 150 to symbol 152C and instruction 158C to transmit over both VNICs (block 664).

Figure 7:
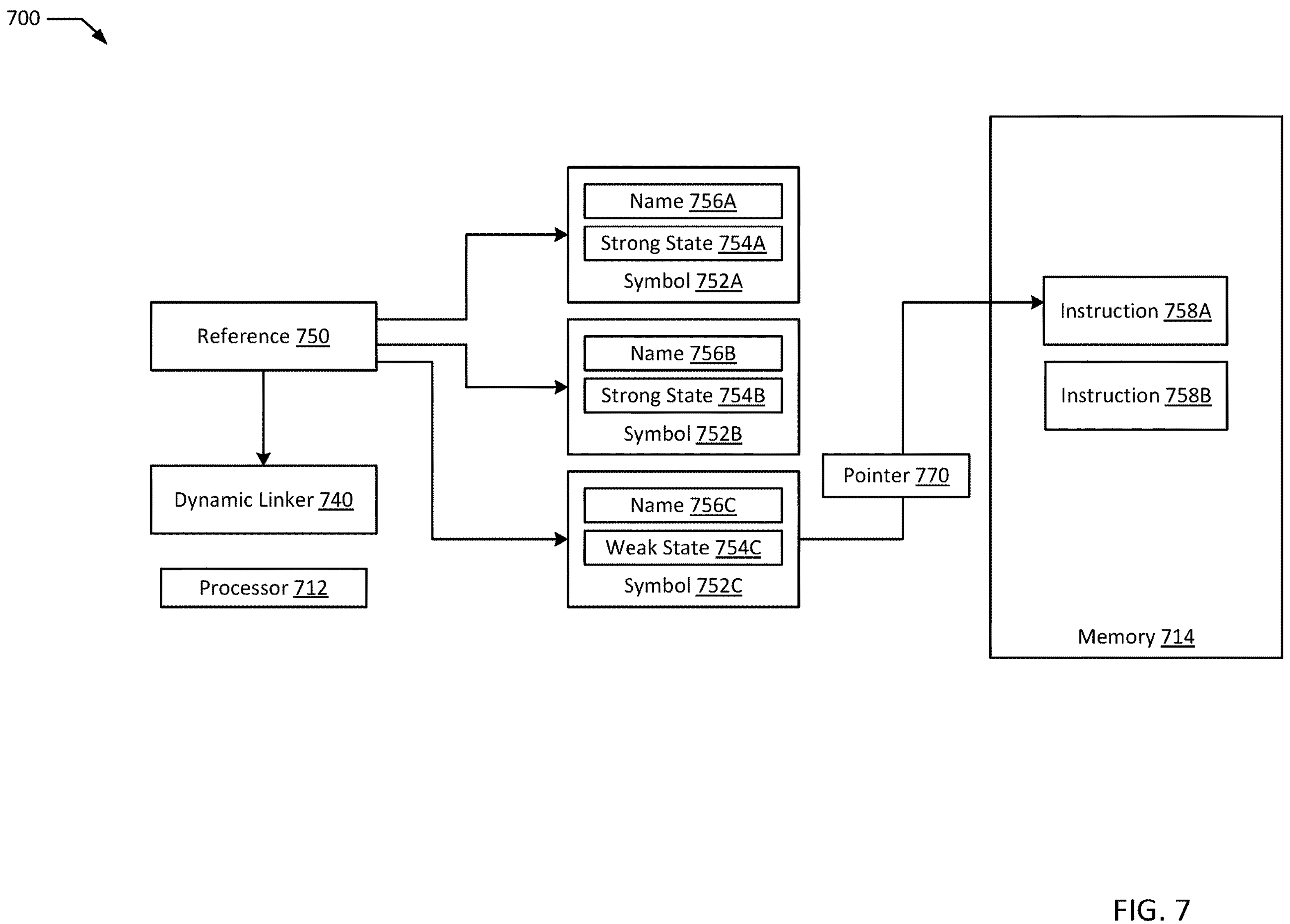
FIG. 7 is a block diagram of an example conflict resolution for strong symbols system according to an example of the present disclosure.

FIG. 7 is a block diagram of an example conflict resolution for strong symbols system according to an example of the present disclosure. Example system 700 includes memory 714 storing instructions 758A and 758B and dynamic linker 740 executing on processor 712. Dynamic linker 740 determines that reference 750 refers to symbol 752A in strong state 754A and symbol 752B in strong state 754B, where symbol 752A and symbol 752B share name 756A-C. Dynamic linker 740 resolves the reference 750 to symbol 752C in weak state 754C which is also sharing name 756A-C, where symbol 752C is a pointer 770 to instruction 758A.

Figure 8:
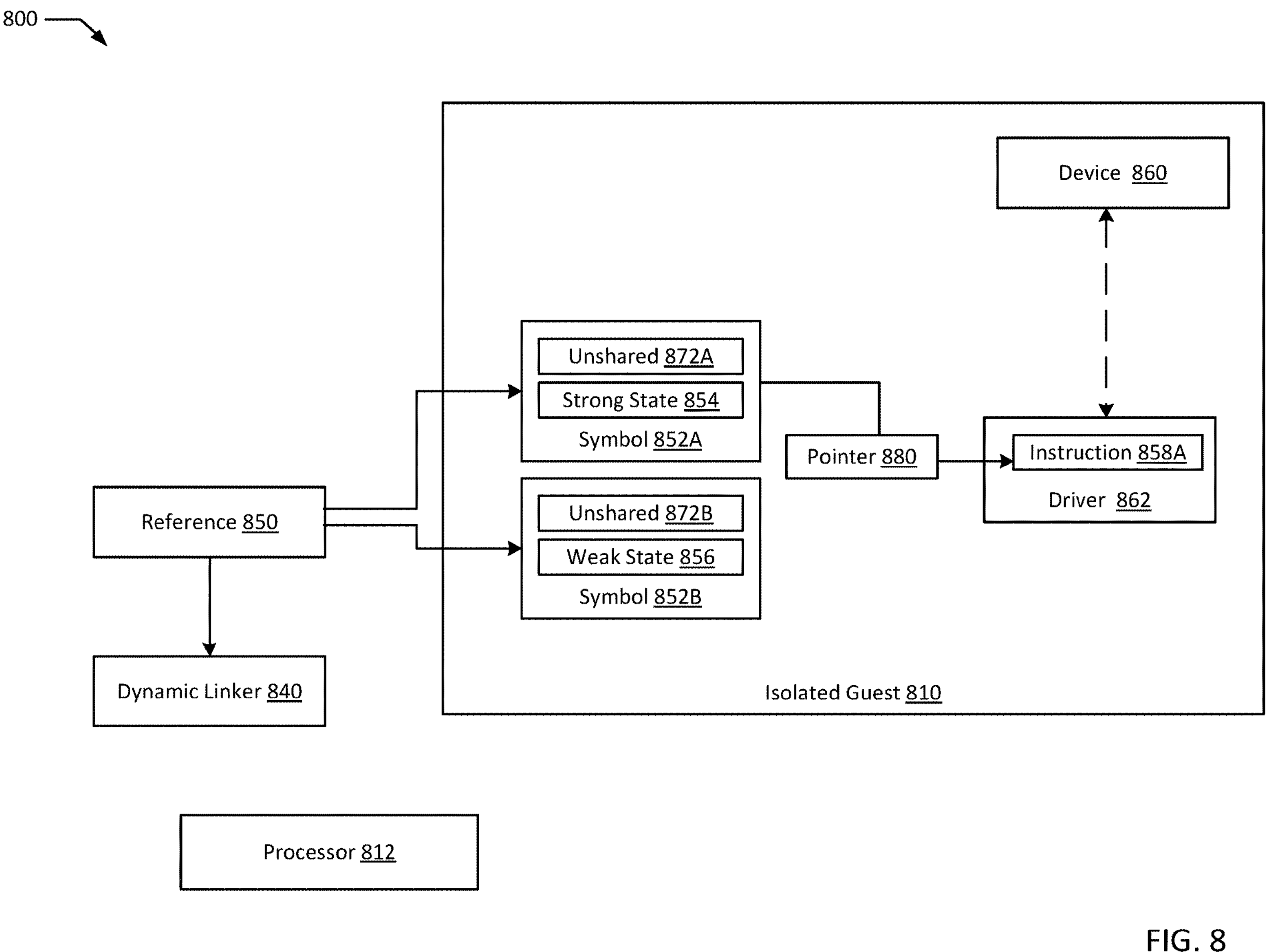
FIG. 8 is a block diagram of accessing memory in an example virtualized conflict resolution for strong symbols system according to an example of the present disclosure.

FIG. 8 is a block diagram of accessing memory in an example virtualized conflict resolution for strong symbols system according to an example of the present disclosure. Example system 800 includes isolated guest 810 with device 860 mounted to isolated guest 810, where device 860 is associated with driver 862, which includes an instruction 858 that is associated with symbol 852A. Dynamic linker 840 executes on processor 812 to determine that reference 850 refers to symbol 852A and symbol 852B, where each symbol (e.g., symbols 852A-B) is in either a strong state 854 or a weak state 856, and each of the strong state (e.g., strong state 854) and the weak state (e.g., weak state 856) is either shared or unshared (e.g., unshared 872A-B). Dynamic linker 840 determines that symbol 852A is in the unshared 872A strong state 854 and that symbol 852B is in the unshared 872B weak state 856. Dynamic linker 840 resolves reference 850 to symbol 852A, where symbol 852A is a pointer 880 to instruction 858.

Conflict resolution for strong symbols allows for the implementation of functions with strong symbols to reduce conditional branches in an executing application's logical flow. This behavior is especially beneficial for computing efficiency in computer systems with speculative execution disabled for security reasons, for example, in shared computing environments such as multi-tenant clouds, because these environments typically employ virtualization (e.g., via virtual machines and/or containers). On virtual hosts, virtual device profiles are typically fairly static for the life of the virtual guest after the virtual guest is fully instantiated, and in many cases, only one virtual driver is associated with each device type. Therefore, in such environments, typical defensive coding using weak symbols or functions not exposed as symbols to avoid potential symbol conflicts may result in unnecessary branch prediction situations where only one outcome is realistically possible. By implementing conflict resolution for strong symbols, some of these unnecessary branches in logical flows may be eliminated from software programs while the programs are still protected against failed and/or erroneous execution in cases where multiple strong symbols do conflict. For example, hardware manufactures and other creators of drivers may safely expose additional functionality as strong symbols, and programmers may implement those strong symbols in their code without concerns that referencing a strong symbol may be adding a potential source of failure for their applications. Processing efficiency is thereby increased and latency reduced while maintaining security against Spectre type attacks.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a memory storing a plurality of instructions including a first instruction; and a dynamic linker executing on one or more processors to: determine that a first reference refers to a first symbol in a strong state and a second symbol in the strong state, wherein the first symbol and the second symbol share a first name; and resolve the first reference to a third symbol in a weak state also sharing the first name, wherein the third symbol is a first pointer to the first instruction.

In accordance with a 2nd exemplary aspect of the present disclosure, which may be used in combination with any one or more of other aspects described herein (e.g., the 1st aspect), wherein the dynamic linker further executes to: determine that a second reference refers to a fourth symbol in the strong state and a fifth symbol in the weak state, wherein the fourth symbol and the fifth symbol share a second name; resolve the second reference to the fourth symbol in the strong state, wherein the fourth symbol is a second pointer to a second instruction. In accordance with a 3rd exemplary aspect of the present disclosure, which may be used in combination with any one or more of other aspects described herein (e.g., the 1st aspect), wherein the dynamic linker further executes to: determine that a third reference refers only to a fourth symbol in the weak state; resolve the third reference to the fourth symbol in the weak state, wherein the fourth symbol is a second pointer to a second instruction. In accordance with a 4th exemplary aspect of the present disclosure, which may be used in combination with any one or more of other aspects described herein (e.g., the 1st aspect), wherein the first instruction invokes a second instruction associated with the first symbol and a third instruction associated with the second symbol. In accordance with a 5th exemplary aspect of the present disclosure, which may be used in combination with any one or more of other aspects described herein (e.g., the 4th aspect), wherein at least one of the third symbol and the first instruction is generated after determining that there is a plurality of symbols in the strong state including the first symbol and the second symbol that share the first name.

In accordance with a 6th exemplary aspect of the present disclosure, which may be used in combination with any one or more of other aspects described herein (e.g., the 1st aspect), wherein the first symbol is associated with a first driver associated with a first device, and the second symbol is associated with a second driver associated with a second device. In accordance with a 7th exemplary aspect of the present disclosure, which may be used in combination with any one or more of other aspects described herein (e.g., the 6th aspect), wherein the third symbol is associated with an operating system on which the first device and the second device are mounted. In accordance with an 8th exemplary aspect of the present disclosure, which may be used in combination with any one or more of other aspects described herein (e.g., the 7th aspect), wherein a third device associated with a third driver associated with a fourth symbol is connected to the system, and executing the first instruction invokes a second instruction associated with the fourth symbol. In accordance with an 9th exemplary aspect of the present disclosure, which may be used in combination with any one or more of other aspects described herein (e.g., the 7th aspect), wherein the second device is disconnected from the system, the first reference is re-resolved to the first symbol, and a second instruction associated with the first symbol is directly invoked bypassing the first instruction. In accordance with a 10th exemplary aspect of the present disclosure, which may be used in combination with any one or more of other aspects described herein (e.g., the 1st aspect), wherein the dynamic linker executes in an isolated guest.

Aspects of the subject matter described herein may be useful alone or in combination with one or more other aspects described herein. In a 11th exemplary aspect of the present disclosure, a method comprises determining that a first reference refers to a first symbol in a strong state and a second symbol in the strong state, wherein the first symbol and the second symbol share a first name; and resolving the first reference to a third symbol in a weak state also sharing the first name, wherein the third symbol is a first pointer to a first instruction of a plurality of instructions.

Aspects of the subject matter described herein may be useful alone or in combination with one or more other aspects described herein. In a 12th exemplary aspect of the present disclosure, a system comprises a means for determining that a first reference refers to a first symbol in a strong state and a second symbol in the strong state, wherein the first symbol and the second symbol share a first name; and a means for resolving the first reference to a third symbol in a weak state also sharing the first name, wherein the third symbol is a first pointer to a first instruction of a plurality of instructions.

Aspects of the subject matter described herein may be useful alone or in combination with one or more other aspects described herein. In a 13th exemplary aspect of the present disclosure, a computer-readable non-transitory storage medium storing executable instructions, which when executed by a computer system, cause the computer system to: determine that a first reference refers to a first symbol in a strong state and a second symbol in the strong state, wherein the first symbol and the second symbol share a first name; and resolve the first reference to a third symbol in a weak state also sharing the first name, wherein the third symbol is a first pointer to a first instruction of a plurality of instructions.

In accordance with a 14th exemplary aspect of the present disclosure, which may be used in combination with any one or more of other aspects described herein (e.g., the 11th, 12th, or 13th aspects), further comprises: determining that a second reference refers to a fourth symbol in the strong state and a fifth symbol in the weak state, wherein the fourth symbol and the fifth symbol share a second name; resolving the second reference to the fourth symbol in the strong state, wherein the fourth symbol is a second pointer to a second instruction. In accordance with a 15th exemplary aspect of the present disclosure, which may be used in combination with any one or more of other aspects described herein (e.g., the 11th, 12th, or 13th aspects), further comprises: determining that a third reference refers only to a fourth symbol in the weak state; resolving the third reference to the fourth symbol in the weak state, wherein the fourth symbol is a second pointer to a second instruction. In accordance with a 16th exemplary aspect of the present disclosure, which may be used in combination with any one or more of other aspects described herein (e.g., the 11th, 12th, or 13th aspects), wherein the first instruction invokes a second instruction associated with the first symbol and a third instruction associated with the second symbol. In accordance with a 17th exemplary aspect of the present disclosure, which may be used in combination with any one or more of other aspects described herein (e.g., the 16th aspect), wherein at least one of the third symbol and the first instruction is generated after determining that there is a plurality of symbols in the strong state including the first symbol and the second symbol that share the first name.

In accordance with an 18th exemplary aspect of the present disclosure, which may be used in combination with any one or more of other aspects described herein (e.g., the 11th, 12th, or 13th aspects), wherein the first symbol is associated with a first driver associated with a first device, and the second symbol is associated with a second driver associated with a second device. In accordance with a 19th exemplary aspect of the present disclosure, which may be used in combination with any one or more of other aspects described herein (e.g., the 18th aspect), wherein the third symbol is associated with an operating system on which the first device and the second device are mounted. In accordance with a 20th exemplary aspect of the present disclosure, which may be used in combination with any one or more of other aspects described herein (e.g., the 19th aspect), wherein a third device associated with a third driver associated with a fourth symbol is connected to the system, and executing the first instruction invokes a second instruction associated with the fourth symbol. In accordance with a 21st exemplary aspect of the present disclosure, which may be used in combination with any one or more of other aspects described herein (e.g., the 19th aspect), wherein the second device is disconnected from the system, the first reference is re-resolved to the first symbol, and a second instruction associated with the first symbol is directly invoked bypassing the first instruction. In accordance with a 22nd exemplary aspect of the present disclosure, which may be used in combination with any one or more of other aspects described herein (e.g., the 11th, 12th, or 13th aspects), wherein a dynamic linker executing in an isolated guest resolves the first reference to the third symbol.

Aspects of the subject matter described herein may be useful alone or in combination with one or more other aspects described herein. In a 23rd exemplary aspect of the present disclosure, a system comprises an isolated guest with a first device mounted to the isolated guest, wherein the first device is associated with a first driver and the first driver includes a first instruction associated with a first symbol; and a dynamic linker executing on one or more processors to: determine that a first reference refers to the first symbol and a second symbol, wherein each symbol is in one of a strong state and a weak state, and each of the strong state and the weak state is one of shared and unshared; determine that the first symbol is in the unshared strong state and the second symbol is in the unshared weak state; and resolve the first reference to the first symbol, wherein the first symbol is a first pointer to the first instruction.

In accordance with a 24th exemplary aspect of the present disclosure, which may be used in combination with any one or more of other aspects described herein (e.g., the 23rd aspect), wherein a second device is mounted to the isolated guest, wherein the second device is associated with a second driver and the second driver includes a second instruction associated with a third symbol, wherein the dynamic linker further executes to: determine that the first reference also refers to the third symbol; determine that the first symbol and the third symbol are in the shared strong state; and resolve the first reference to the second symbol, wherein the second symbol is a second pointer to a third instruction. In accordance with a 25th exemplary aspect of the present disclosure, which may be used in combination with any one or more of other aspects described herein (e.g., the 24th aspect), wherein executing the third instruction causes both the first instruction and the second instruction to execute. In accordance with a 26th exemplary aspect of the present disclosure, which may be used in combination with any one or more of other aspects described herein (e.g., the 24th aspect), wherein the first device is unmounted and the first reference is resolved to the third symbol in the unshared strong state, wherein the third symbol is a pointer to the second instruction. In accordance with a 27th exemplary aspect of the present disclosure, which may be used in combination with any one or more of other aspects described herein (e.g., the 24th aspect), wherein a second reference refers only to a fourth symbol in the weak state, wherein the fourth symbol is associated with a fourth instruction. In accordance with a 28th exemplary aspect of the present disclosure, which may be used in combination with any one or more of other aspects described herein (e.g., the 27th aspect), wherein executing the fourth instruction causes both the first instruction and the second instruction to execute.

In accordance with a 29th exemplary aspect of the present disclosure, which may be used in combination with any one or more of other aspects described herein (e.g., the 23rd aspect), wherein the dynamic linker further executes to: determine that a second reference fails to match any symbol; and raise an error. In accordance with a 30th exemplary aspect of the present disclosure, which may be used in combination with any one or more of other aspects described herein (e.g., the 23rd aspect), wherein the second symbol in the weak state is associated with an operating system of the isolated guest, and the second symbol is associated with a second instruction that is configured to cycle through and execute any instructions associated with any symbols in the strong state that share an association with the first reference with the second symbol, including the first instruction associated with the first symbol. In accordance with a 31st exemplary aspect of the present disclosure, which may be used in combination with any one or more of other aspects described herein (e.g., the 23rd aspect), wherein the first symbol is associated with a first transmit function of a first device and the second symbol is associated with a second transmit function of the isolated guest.

Aspects of the subject matter described herein may be useful alone or in combination with one or more other aspects described herein. In a 32nd exemplary aspect of the present disclosure, a method comprises determining that a first reference refers to a first symbol and a second symbol, wherein each symbol is in one of a strong state and a weak state, and each of the strong state and the weak state is one of shared and unshared, wherein the first symbol is associated with a first instruction included in a first driver associated with a first device mounted to an isolated guest; determining that the first symbol is in the unshared strong state and the second symbol is in the unshared weak state; and resolving the first reference to the first symbol, wherein the first symbol is a first pointer to the first instruction.

Aspects of the subject matter described herein may be useful alone or in combination with one or more other aspects described herein. In a 33rd exemplary aspect of the present disclosure, a system comprises a means for determining that a first reference refers to a first symbol and a second symbol, wherein each symbol is in one of a strong state and a weak state, and each of the strong state and the weak state is one of shared and unshared, wherein the first symbol is associated with a first instruction included in a first driver associated with a first device mounted to an isolated guest; a means for determining that the first symbol is in the unshared strong state and the second symbol is in the unshared weak state; and a means for resolving the first reference to the first symbol, wherein the first symbol is a first pointer to the first instruction.

Aspects of the subject matter described herein may be useful alone or in combination with one or more other aspects described herein. In a 34th exemplary aspect of the present disclosure, a computer-readable non-transitory storage medium storing executable instructions, which when executed by a computer system, cause the computer system to: determine that a first reference refers to a first symbol and a second symbol, wherein each symbol is in one of a strong state and a weak state, and each of the strong state and the weak state is one of shared and unshared, wherein the first symbol is associated with a first instruction included in a first driver associated with a first device mounted to an isolated guest; determine that the first symbol is in the unshared strong state and the second symbol is in the unshared weak state; and resolve the first reference to the first symbol, wherein the first symbol is a first pointer to the first instruction.

In accordance with a 35th exemplary aspect of the present disclosure, which may be used in combination with any one or more of other aspects described herein (e.g., the 32nd, 33rd, or 34th aspects), wherein a second device is mounted to the isolated guest, wherein the second device is associated with a second driver and the second driver includes a second instruction associated with a third symbol, the method further comprises: determining that the first reference also refers to the third symbol; determining that the first symbol and the third symbol are in the shared strong state; and resolving the first reference to the second symbol, wherein the second symbol is a second pointer to a third instruction. In accordance with a 36th exemplary aspect of the present disclosure, which may be used in combination with any one or more of other aspects described herein (e.g., the 35th aspect), wherein executing the third instruction causes both the first instruction and the second instruction to execute. In accordance with a 37th exemplary aspect of the present disclosure, which may be used in combination with any one or more of other aspects described herein (e.g., the 35th aspect), wherein the first device is unmounted and the first reference is resolved to the third symbol in the unshared strong state, wherein the third symbol is a pointer to the second instruction. In accordance with a 38th exemplary aspect of the present disclosure, which may be used in combination with any one or more of other aspects described herein (e.g., the 35th aspect), wherein a second reference refers only to a fourth symbol in the weak state, wherein the fourth symbol is associated with a fourth instruction. In accordance with a 39th exemplary aspect of the present disclosure, which may be used in combination with any one or more of other aspects described herein (e.g., the 38th aspect), wherein executing the fourth instruction causes both the first instruction and the second instruction to execute.

In accordance with a 40th exemplary aspect of the present disclosure, which may be used in combination with any one or more of other aspects described herein (e.g., the 32nd, 33rd, or 34th aspects), further comprises: determining that a second reference fails to match any symbol; and raising an error. In accordance with a 41st exemplary aspect of the present disclosure, which may be used in combination with any one or more of other aspects described herein (e.g., the 32nd, 33rd, or 34th aspects), wherein the second symbol in the weak state is associated with an operating system of the isolated guest, and the second symbol is associated with a second instruction that is configured to cycle through and execute any instructions associated with any symbols in the strong state that share an association with the first reference with the second symbol, including the first instruction associated with the first symbol. In accordance with a 42nd exemplary aspect of the present disclosure, which may be used in combination with any one or more of other aspects described herein (e.g., the 32nd, 33rd, or 34th aspects), wherein the first symbol is associated with a first transmit function of a first device and the second symbol is associated with a second transmit function of the isolated guest.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system for conflict resolution for strong symbols, the system comprising:
- a memory storing a plurality of instructions including a first instruction; and
- a dynamic linker executing on one or more processors, to wherein the dynamic linker:
- determines that a first reference refers to a first symbol in a strong state and a second symbol in the strong state, wherein the first symbol and the second symbol share a first name; and
- resolves the first reference to a third symbol in a weak state also sharing the first name, wherein the third symbol is a first pointer to the first instruction.

2. The system of claim 1, wherein the dynamic linker further:
- determines that a second reference refers to a fourth symbol in the strong state and a fifth symbol in the weak state, wherein the fourth symbol and the fifth symbol share a second name; and
- resolves the second reference to the fourth symbol in the strong state, wherein the fourth symbol is a second pointer to a second instruction.

3. The system of claim 1, wherein the dynamic linker further:
- determines that a third reference refers only to a fourth symbol in the weak state; and
- resolves the third reference to the fourth symbol in the weak state, wherein the fourth symbol is a second pointer to a second instruction.

4. The system of claim 1, wherein the first instruction invokes a second instruction associated with the first symbol and a third instruction associated with the second symbol.

5. The system of claim 1, wherein the first symbol is associated with a first driver associated with a first device, the second symbol is associated with a second driver associated with a second device, and the third symbol is associated with an operating system on which the first device and the second device are mounted.

6. The system of claim 5, wherein a third device associated with a third driver associated with a fourth symbol is connected to the system, and executing the first instruction invokes a second instruction associated with the fourth symbol.

7. The system of claim 5, wherein the second device is disconnected from the system, the first reference is resolved to the first symbol, and a second instruction associated with the first symbol is directly invoked bypassing the first instruction.

8. A method of conflict resolution for strong symbols, the method comprising:
- determining, with a dynamic linker, that a first reference refers to a first symbol in a strong state and a second symbol in the strong state, wherein the first symbol and the second symbol share a first name; and
- resolving, with the dynamic linker, the first reference to a third symbol in a weak state also sharing the first name, wherein the third symbol is a first pointer to a first instruction of a plurality of instructions.

9. The method of claim 8, further comprising:
- determining, with the dynamic linker, that a second reference refers to a fourth symbol in the strong state and a fifth symbol in the weak state, wherein the fourth symbol and the fifth symbol share a second name; and
- resolving, with the dynamic linker, the second reference to the fourth symbol in the strong state, wherein the fourth symbol is a second pointer to a second instruction.

10. The method of claim 8, further comprising:
- determining, with the dynamic linker, that a third reference refers only to a fourth symbol in the weak state; and
- resolving, with the dynamic linker, the third reference to the fourth symbol in the weak state, wherein the fourth symbol is a second pointer to a second instruction.

11. The method of claim 8, wherein the first instruction invokes a second instruction associated with the first symbol and a third instruction associated with the second symbol.

12. The method of claim 11, wherein at least one of the third symbol and the first instruction is generated after determining that there is a plurality of symbols in the strong state including the first symbol and the second symbol that share the first name.

13. The method of claim 8, wherein the first symbol is associated with a first driver associated with a first device, and the second symbol is associated with a second driver associated with a second device.

14. A system for conflict resolution for strong symbols, the system comprising:
- a memory storing a plurality of instructions, an isolated guest with a first device mounted to the isolated guest, wherein the first device is associated with a first driver and the first driver includes a first instruction associated with a first symbol, the first instruction included in the plurality of instructions; and
- a dynamic linker executing on one or more processors, wherein the dynamic linker:
  - determines that a first reference refers to the first symbol and a second symbol, wherein each symbol is in one of a strong state and a weak state, and each of the strong state and the weak state is one of shared and unshared;
  - determines that the first symbol is in the unshared strong state and the second symbol is in the unshared weak state; and
  - resolves the first reference to the first symbol, wherein the first symbol is a first pointer to the first instruction.

15. The system of claim 14, wherein a second device is mounted to the isolated guest, wherein the second device is associated with a second driver and the second driver includes a second instruction associated with a third symbol, and wherein the dynamic linker further:

determines that the first reference also refers to the third symbol;

determines that the first symbol and the third symbol are in the shared strong state; and resolves the first reference to the second symbol, wherein the second symbol is a second pointer to a third instruction, and wherein executing the third instruction causes both the first instruction and the second instruction to execute.

16. The system of claim 15, wherein the first device is unmounted and the first reference is resolved to the third symbol in the unshared strong state, and wherein the third symbol is a pointer to the second instruction.

17. The system of claim 15, wherein a second reference refers only to a fourth symbol in the weak state, and wherein the fourth symbol is associated with a fourth instruction.

18. The system of claim 17, wherein executing the fourth instruction causes both the first instruction and the second instruction to execute.

19. The system of claim 14, wherein the second symbol in the weak state is associated with an operating system of the isolated guest, and the second symbol is associated with a second instruction that is configured to cycle through and execute any instructions associated with any symbols in the strong state that share an association with the first reference with the second symbol, including the first instruction associated with the first symbol.

20. The system of claim 14, wherein the first symbol is associated with a first transmit function of a first device and the second symbol is associated with a second transmit function of the isolated guest.

* * * * *